US006501803B1

(12) United States Patent
Alamouti et al.

(10) Patent No.: US 6,501,803 B1
(45) Date of Patent: Dec. 31, 2002

(54) LOW COMPLEXITY MAXIMUM LIKELIHOOD DETECTING OF CONCATENATED SPACE CODES FOR WIRELESS APPLICATIONS

(75) Inventors: Siavash Alamouti, Kirkland, WA (US); Patrick Poon, Lamtin (HK); Vahid Tarokh, Hackensack, NJ (US)

(73) Assignee: AT&T Wireless Services, Inc., Redmond, WA (US)

(*) Notice: Subject to any disclaimer, the term of this patent is extended or adjusted under 35 U.S.C. 154(b) by 0 days.

(21) Appl. No.: 09/167,422

(22) Filed: Oct. 5, 1998

(51) Int. Cl.[7] .............................. H04L 5/12; H04B 7/06

(52) U.S. Cl. ........................ 375/265; 375/267; 714/792

(58) Field of Search ................................ 375/265, 267; 714/792, 786

(56) References Cited

U.S. PATENT DOCUMENTS

| | | | | |
|---|---|---|---|---|
| 5,022,053 A | * | 6/1991 | Chung et al. ................ | 375/265 |
| 5,479,448 A | | 12/1995 | Seshadri | |
| 5,790,570 A | * | 8/1998 | Heegard et al. ............. | 375/262 |
| 6,115,427 A | | 9/2000 | Calderbank et al. | |
| 6,185,258 B1 | | 2/2001 | Alamouti et al. | |

FOREIGN PATENT DOCUMENTS

| | | |
|---|---|---|
| CA | 2252664 | 11/1997 |
| CA | 2302289 | 3/1998 |
| WO | WO 97-24849 A | 7/1997 |
| WO | WO 97/41670 | 11/1997 |
| WO | WO 97 41670 A | 11/1997 |
| WO | WO 98/09385 | 3/1998 |
| WO | WO 99 14871 A | 3/1999 |

OTHER PUBLICATIONS

Seshadri, N., et al., Space–Time Codes for Wireless Communication: Code Construction, 1997, IEEE 47th Vehicular Technology Conf., Phoenix, May 4–7, 1997, pp. 637–641.

Seshadri, et al., Advanced Techniques for Modulation, Error Correction, Channel Equalization and Diversity, AT&T Tech. Journal, vol. 72, No. 4, Jul. 1, 1993, pp. 48–63.

Alamouti, S. S., "A Simple Transmit Diversity Technique for Wireless Communications", IEEE Journal on Selected Areas in Communications, Oct. 1998, IEEE, vol. 16, No. 8, pp. 1451–1458.

Tarokh, V., et al., "Space–Time Codes for High Data Rate Wireless Communication: Performance Criterion and Code Construction", IEEE Trans. On Info. Theory, vol. 44, No. 2, Mar. 1998, pp. 744–765.

Tarokh, V., et al., "Space–Time Codes for High Data Rate Wireless Communication: Performance Criteria", 1997 IEEE Int'l Conf. On Communications, Montreal, Jun. 8–12, 1997, vol. 1, pp. 299–303.

(List continued on next page.)

Primary Examiner—Temesghen Ghebretinsae
(74) Attorney, Agent, or Firm—Perkins Coie LLP

(57) ABSTRACT

Good transmission characteristics are achieved in the presence of fading with a transmitter that employs a trellis coder followed by a block coder. Correspondingly, the receiver comprises a Viterbi decoder followed by a block decoder. Advantageously, the block coder and decoder employ time-space diversity coding which, illustratively, employs two transmitter antennas and one receiver antenna.

5 Claims, 1 Drawing Sheet

OTHER PUBLICATIONS

Seshadri, N. et al., "Two Signaling Schemes for Improving the Error Performance of FDD Transmission Systems Using Transmitter Antenna Diversity," *Proceeding of the 1993 IEEE Vehicular Technology Conference*(VTC 43$^{rd}$), pp. 508–511, May 1993.

Winters, J.H., "The Diversity Gain of Transmit Diversity in Wireless Systems with Rayleigh Fading,"*Proceeding of the 1994 ICC/SUPERCOMM*, New Orleans, vol. 2, pp. 1121–1125, May 1994.

Wittneben, A. "A New Bandwidth Efficient Transmit Antenna Modulation Diversity Scheme for Linear Digital Modulation," *Proceeding of the 1993 IEEE International Conference on Communications*(IICC '93), pp. 1630–1634, May 1993.

Wittneben, A. "Base Station Modulation Diversity for Digital SIMULCAST," *Proceeding of the 1991 IEEE Vehicular Technology Conference*(VTC 41$^{st}$), pp. 848–853, May 1991.

* cited by examiner

LOW COMPLEXITY MAXIMUM LIKELIHOOD DETECTING OF CONCATENATED SPACE CODES FOR WIRELESS APPLICATIONS

REFERENCE TO RELATED APPLICATIONS

This application claims the benefit of U.S. Provisional Application No. 60/063,794, filed Oct. 31, 1997.

BACKGROUND OF THE INVENTION

This invention relates to wireless communication and, more particularly, to techniques for effective wireless communication in the presence of fading and other degradations.

The most effective technique for mitigating multipath fading in a wireless radio channel is to cancel the effect of fading at the transmitter by controlling the transmitter's power. That is, if the channel conditions are known at the transmitter (on one side of the link), then the transmitter can pre-distort the signal to overcome the effect of the channel at the receiver (on the other side). However, there are two fundamental problems with this approach. The first problem is the transmitter's dynamic range. For the transmitter to overcome an x dB fade, it must increase its power by x dB which, in most cases, is not practical because of radiation power limitations, and the size and cost of amplifiers. The second problem is that the transmitter does not have any knowledge of the channel as seen by the receiver (except for time division duplex systems, where the transmitter receives power from a known other transmitter over the same channel). Therefore, if one wants to control a transmitter based on channel characteristics, channel information has to be sent from the receiver to the transmitter, which results in throughput degradation and added complexity to both the transmitter and the receiver.

Other effective techniques are time and frequency diversity. Using time interleaving together with coding can provide diversity improvement. The same holds for frequency hopping and spread spectrum. However, time interleaving results in unnecessarily large delays when the channel is slowly varying. Equivalently, frequency diversity techniques are ineffective when the coherence bandwidth of the channel is large (small delay spread).

It is well known that in most scattering environments antenna diversity is the most practical and effective technique for reducing the effect of multipath fading. The classical approach to antenna diversity is to use multiple antennas at the receiver and perform combining (or selection) to improve the quality of the received signal.

The major problem with using the receiver diversity approach in current wireless communication systems, such as IS-136 and GSM, is the cost, size and power consumption constraints of the receivers. For obvious reasons, small size, weight and cost are paramount. The addition of multiple antennas and RF chains (or selection and switching circuits) in receivers is presently not be feasible. As a result, diversity techniques have often been applied only to improve the up-link (receiver to base) transmission quality with multiple antennas (and receivers) at the base station. Since a base station often serves thousands of receivers, it is more economical to add equipment to base stations rather than the receivers Recently, some interesting approaches for transmitter diversity have been suggested. A delay diversity scheme was proposed by A. Wittneben in "Base Station Modulation Diversity for Digital SIMULCAST," Proceeding of the 1991 IEEE Vehicular Technology Conference (VTC 41st), PP. 848–853, May 1991, and in "A New Bandwidth Efficient Transmit Antenna Modulation Diversity Scheme For Linear Digital Modulation," in Proceeding of the 1993 IEEE International Conference on Communications (IICC '93), PP. 1630–1634, May 1993. The proposal is for a base station to transmit a sequence of symbols through one antenna, and the same sequence of symbols—but delayed—through another antenna.

U.S. Pat. No. 5,479,448, issued to Nambirajan Seshadri on Dec. 26, 1995, discloses a similar arrangement where a sequence of codes is transmitted through two antennas. The sequence of codes is routed through a cycling switch that directs each code to the various antennas, in succession. Since copies of the same symbol are transmitted through multiple antennas at different times, both space and time diversity are achieved. A maximum likelihood sequence estimator (MLSE) or a minimum mean squared error (MMSE) equalizer is then used to resolve multipath distortion and provide diversity gain. See also N. Seshadri, J. H. Winters, "Two Signaling Schemes for Improving the Error Performance of FDD Transmission Systems Using Transmitter Antenna Diversity," *Proceeding of the 1993 IEEE Vehicular Technology Conference* (VTC 43rd), pp. 508–511, May 1993; and J. H. Winters, "The Diversity Gain of Transmit Diversity in Wireless Systems with Rayleigh Fading," *Proceeding of the 1994 ICC/SUPERCOMM*, New Orleans, Vol. 2, PP. 1121–1125, May 1994.

Still another interesting approach is disclosed by Tarokh, Seshadri, Calderbank and Naguib in U.S. application, Ser. No. 08/847635 now U.S. Pat. No. 6,115,427, filed Apr. 25, 1997 (based on a provisional application filed Nov. 7, 1996), where symbols are encoded according to the antennas through which they are simultaneously transmitted, and are decoded using a maximum likelihood decoder. More specifically, the process at the transmitter handles the information in blocks of M1 bits, where M1 is a multiple of M2, i.e., M1=k*M2. It converts each successive group of M2 bits into information symbols (generating thereby k information symbols), encodes each sequence of k information symbols into n channel codes (developing thereby a group of n channel codes for each sequence of k information symbols), and applies each code of a group of codes to a different antenna.

Yet another approach is disclosed by Alamouti and Tarokh in U.S. application, Ser. No. 09/074,224, filed May 5, 1998 now U.S. Pat. No. 6,185,258, and titled "Transmitter Diversity Technique for Wireless Communications" where symbols are encoded using only negations and conjugations, and transmitted in a manner that employs channel diversity.

Still another approach is disclosed by the last-mentioned inventors in a US application filed Jul. 14, 1998, based on provisional application 60/052,689 filed Jul. 17, 1997, titled "Combined Array Processing and Space-Time Coding" where symbols are divided into groups, where each group is transmitted over a separate group of antennas and is encoded with a group code C that is a member of a product code.

SUMMARY

An advance in the art is realized with a transmitter that employs a trellis coder followed by a block coder. Correspondingly, the receiver comprises a Viterbi decoder followed by a block decoder. Advantageously, the block coder and decoder employ time-space diversity coding which, illustratively, employs two transmitter antennas and one receiver antenna.

DETAIL DESCRIPTION

Figure 1:
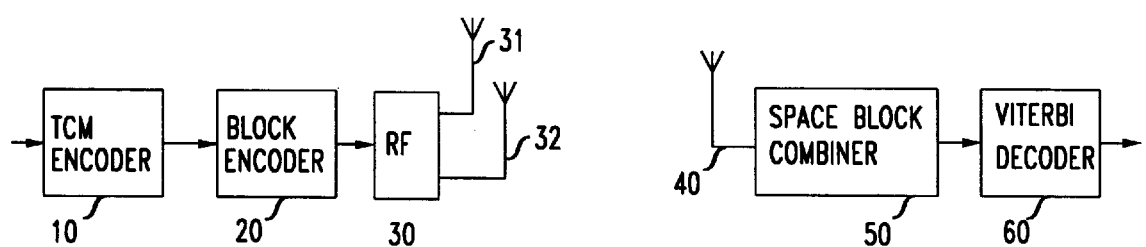
FIG. 1 presents a block diagram of an embodiment in conformance with the principles of this invention.

FIG. 1 presents a block diagram of an arrangement comporting with the principles of this invention. It comprises a trellis code modulation (TCM) encoder 10 followed by a two-branch space block encoder 20. The output is applied to antenna circuitry 30, which feeds antenna 31, and antenna 32. FIG. 1 shows only two antennas, but this is merely illustrative. Arrangements can be had with a larger number of antennas, and it should be understood that the principles disclosed herein apply with equal advantage to such arrangements.

TCM encoder 10 generates complex numbers that represent constellation symbols, and block encoder 20 encodes (adjacent) pairs of symbols in the manner described in the aforementioned Ser. No. 09/074,224 application. That is, symbols $s_0$ and $s_1$, forming a pair, are sent to antenna 31 and antenna 32, respectively, and in the following time period symbols $-s_1^*$ and $s_0^*$ are sent to antennas 31 and 32, respectively. Thereafter, symbols $s_2$ and $s_3$ are sent to antenna 31 and 32, respectively, etc. Thus, encoder 20 creates channel diversity that results from signals traversing from the transmitter to the receiver at different times and over different channels.

The signals transmitted by antennas 31 and 32 are received by a receiver after traversing the airlink and suffering a multiplicative distortion and additive noise. Hence, the received signals at the two consecutive time intervals during which the signals $s_0$, $s_1$, $-s_1^*$, and $s_0^*$ are sent correspond to:

$$r_0(t) = h_0 s_0 + h_1 s_1 + n_0, \quad (1)$$

and $$r_1(t) = h_1 s_0^* - h_0 s_1^* + n_1, \quad (2)$$

where $h_0$ represents the channel from antenna 31, $h_1$ represents the channel from antenna 32, $n_0$ is the received noise at the first time interval, and $n_1$ is the received noise at the second time interval.

The receiver comprises a receive antenna 40, a two-branch space block combiner 50, and a Viterbi decoder 60. The receiver also includes a channel estimator; but since that is perfectly conventional and does not form a part of the invention, FIG. 1 does not explicitly show it. The following assumes that the receiver possesses $\tilde{h}_0$ and $\tilde{h}_1$, which are estimates of $h_0$ and $h_1$, respectively. Thus, the received signals at the first and second time intervals are combined in element 50 to form signals $$\tilde{s}_0 = \tilde{h}_0^* r_0 + \tilde{h}_1 r_1^* \quad (3)$$

and $$\tilde{s}_1 = \tilde{h}_1^* r_0 - \tilde{h}_0 r_1^*, \quad (4)$$

and those signals are applied to Viterbi decoder 60.

The Viterbi decoder builds the following metric for the hypothesized branch symbol $s_i$ corresponding to the first transmitted symbol $s_0$:

$$M(s_0, s_i) = d^2[\tilde{s}_0, (|\tilde{h}_0|^2 + |\tilde{h}_1|^2) s_i]. \quad (5)$$

Similarly, the Viterbi decoder builds the following metric for the hypothesized branch symbol $s_i$ corresponding to the first transmitted symbol $s_1$:

$$M(s_1, s_i) = d^2[\tilde{s}_1, (|\tilde{h}_0|^2 + |\tilde{h}_1|^2) s_i]. \quad (6)$$

(Additional metrics are similarly constructed in arrangements that employ a larger number of antennas and a correspondingly larger constellation of signals transmitted at any one time.) If Trellis encoder 10 is a multiple TCM encoder, then the Viterbi decoder builds the following metric:

$$M[(s_0, s_1), (s_i, s_j)] = M(s_0, s_i) + M(s_1, s_j). \quad (7)$$

or equivalently, $$M[(s_0, s_1), (s_i, s_j)] = d^2(r_0, \tilde{h}_0 s_i + \tilde{h}_1 s_j) + d^2(r_1, \tilde{h}_1 s_i^* - \tilde{h}_0 s_j^*). \quad (8)$$

The Viterbi decoder outputs estimates of the transmitted sequence of signals.

The above presented an illustrative embodiment. However, it should be understood that various modifications and alternations might be made by a skilled artisan without departing from the spirit and scope of this invention.

We claim:

1. A transmitter comprising:
    a trellis encoder that encodes incoming digital data to generate complex numbers representing constellation symbols defined as $s_0$ and $s_1$, wherein the trellis encoder transmits by a first antenna and a second antenna, respectively, during a first time or frequency interval;
    a space-block encoder responsive to the constellation symbols to encode two adjacent constellation symbols as a block comprising two trellis-coded symbols and two parity symbols chosen from a group consisting of negated trellis-coded symbols, complex conjugates of the trellis-coded symbols, and negative complex conjugates of the trellis-coded symbols, wherein the space-block encoder is adapted to feed two antennas such that a different symbol is transmitted by each antenna; and
    wherein the symbols $-s_1^*$ and $s_0^*$ are generated by the space-block encoder and transmitted by the first antenna and the second antenna, respectively, during a second time or frequency interval, wherein $s_i^*$ is defined as a complex conjugate of a symbol $s_i$.

2. The transmitter of claim 1, wherein the space-block encoder is a multi-branch encoder.

3. The transmitter of claim 1 wherein the space-block encoder is a multi-branch space-block encoder.

4. The transmitter of claim 1 wherein the space-block encoder is a space-time block encoder.

5. The transmitter of claim 1 wherein the space-block encoder is a space-frequency block encoder.

* * * * *

UNITED STATES PATENT AND TRADEMARK OFFICE
CERTIFICATE OF CORRECTION

PATENT NO. : 6,501,803 B1
DATED : December 31, 2002
INVENTOR(S) : Alamouti et al.

It is certified that error appears in the above-identified patent and that said Letters Patent is hereby corrected as shown below:

<u>Title page, Item [54] and Column 1, line 2,</u>
Title, "DETECTING" should be -- DETECTION --;

<u>Column 4,</u>
Lines 54, 56 and 58, insert comma between "1" and " wherein";

Signed and Sealed this

Eighth Day of July, 2003

JAMES E. ROGAN
*Director of the United States Patent and Trademark Office*